United States Patent [19]

Marendaz

[11] Patent Number: 4,675,491
[45] Date of Patent: Jun. 23, 1987

[54] PROCESS AND APPARATUS FOR MONITORING THERMAL STRESSES IN AN ELECTRODE WIRE IN AN EDM APPARATUS

[75] Inventor: Georges-André Marendaz, Borex, Switzerland

[73] Assignee: Charmilles Technologies S.A., Geneva, Switzerland

[21] Appl. No.: 756,056

[22] Filed: Jul. 17, 1985

[30] Foreign Application Priority Data

Jul. 17, 1984 [CH] Switzerland .................. 3466/84

[51] Int. Cl.⁴ .................. B23H 1/02; B23H 7/02
[52] U.S. Cl. .................. 219/69 W; 219/69 C; 219/69 M
[58] Field of Search .................. 219/69 W, 69 M, 69 C, 219/69 S, 69 R

[56] References Cited

U.S. PATENT DOCUMENTS

| | | | |
|---|---|---|---|
| 4,296,302 | 10/1981 | Bell, Jr. et al. | 219/69 C |
| 4,329,558 | 5/1982 | Martin | 219/69 M |
| 4,527,034 | 7/1985 | Inoue et al. | 219/69 C |
| 4,559,432 | 12/1985 | Itoh | 219/69 C |
| 4,559,434 | 12/1985 | Kinoshita | 219/69 M |
| 4,575,605 | 3/1986 | Martin | 219/69 W |

FOREIGN PATENT DOCUMENTS

| | | | |
|---|---|---|---|
| 52-58195 | 5/1977 | Japan | 219/69 C |
| 53-87089 | 8/1978 | Japan | 219/69 W |
| 55-48531 | 4/1980 | Japan | 219/69 C |
| 101332 | 8/1980 | Japan | 219/69 C |
| 56-52132 | 5/1981 | Japan | 219/69 C |
| 124519 | 7/1984 | Japan | 219/69 C |
| 169717 | 9/1984 | Japan | 219/69 C |
| 2041574A | 9/1980 | United Kingdom | 219/69 C |

Primary Examiner—M. H. Paschall
Assistant Examiner—Geoffrey S. Evans
Attorney, Agent, or Firm—Hauke and Patalidis

[57] ABSTRACT

In a travelling wire EDM apparatus in which a workpiece is cut by an electrode wire by electrical discharges between the wire and the workpiece, a detector circuit detecting each electrical discharge occuring in each sector along the length of the wire in the machining zone. The information detected by the detector circuit is supplied to a circuit simulating the increase of heat of the wire, and the convection of heat into the ambient and into adjoining wire sectors. A control signal for modifying a machining parameter is supplied when the simulator circuit provides an indication of abnormal heating of the wire in one of the wire sectors. Accidental rupture of the wire is thus avoided while assuring that machining is effected at maximum efficiency.

10 Claims, 7 Drawing Figures

PROCESS AND APPARATUS FOR MONITORING THERMAL STRESSES IN AN ELECTRODE WIRE IN AN EDM APPARATUS

BACKGROUND OF THE INVENTION

The invention relates to a process and apparatus for monitoring the thermal stresses or constraints of an electrode wire being displaced longitudinally between two guide members in an apparatus for cutting an electrode workpiece by erosive electrical discharge, the presence of an electrical discharge being detected at a predetermined sector along the length of the wire in the machining zone between the electrode wire and the workpiece.

In the course of cutting a workpiece in a travelling wire EDM apparatus, the electrode wire is subjected to thermal stresses which limit the level of the permissible current of the electrical discharges, and consequently the speed at which the workpiece is cut, or material removal rate. The thermal stresses are caused by resistance heating of the wire and by the heat conveyed to the wire by the electrical discharges themselves. The latter type of stresses, which may be the cause of many unknown reasons for the rupture of the wire, is dependent to a large degree on the density of the electrical discharges along the active length of the wire. An abnormal concentration of electrical discharges, due to electrical discharges occuring very close to each other, causes a local heating of the wire which could be a cause of wire rupture.

Diverse methods have been proposed in the past for monitoring the distribution of the electrical discharges along the active portion of the wire. For example, published patent DE-OS No. 3.026.508 and Japanese No. 53-64899 disclose circuits which subdivide the wire in sectors and which permit determination of the sector in which an electrical discharge has occurred. A signal is provided when a predetermined number of consecutive electrical discharges have occurred in the same sector. Such known methods, however, are not sufficient to provide an indication of the actual heating of the wire. As a consequence of the high repetition rate of the electrical discharges and of the relatively wide time constant during which the heat is dissipated from a wire sector, a critical temperature may be reached in a given sector even though the electrical discharges occurring in that sector are not consecutive. Consequently, although a known criteria of the number of consecutive electrical discharges is necessary, it is not sufficient in order to warn against abnormal heating of the wire.

SUMMARY OF THE INVENTION

The present invention overcomes the inconvenience and shortcomings of the prior art by monitoring the thermal stresses exerted on the wire by means of an auxiliary circuit providing a thermal simulation model of the wire and of its environment, the simulation model being controlled in the real time by a circuit known in the art for detecting the position of each electrical discharge. The novel monitoring process of the invention is characterized in that it consists in associating with each discharge a magnitude which represents the increase in heat caused by one electrical discharge in a wire sector, storing such magnitude in a memory, extracting such magnitude from the memory according to a predetermined time function so as to simulate the heat loss into the machining fluid, and providing a signal for varying a machining parameter as soon as the sum of the magnitudes remaining in the memory reaches a predetermined level.

In such manner, a new parameter is provided which is the speed at which heat is radiated through the wire and through the ambient, the temperature of a wire sector depending on the balance between the heat supplied to the wire and the heat radiated by the wire. The thermal simulation model may also be perfected by an appropriate choice of the time constant according to which the magnitudes stored in the memory are extracted from the memory, and through the introduction of a function simulating the longitudinal displacement of the wire in the machining zone.

The present invention will become readily apparent to those skilled in the art when the following description of examples of the best modes contemplated at the present for practicing the invention is read in conjunction with the accompanying drawings in which:

DETAILED DESCRIPTION OF THE PREFERRED EMBODIMENTS

Figure 1:
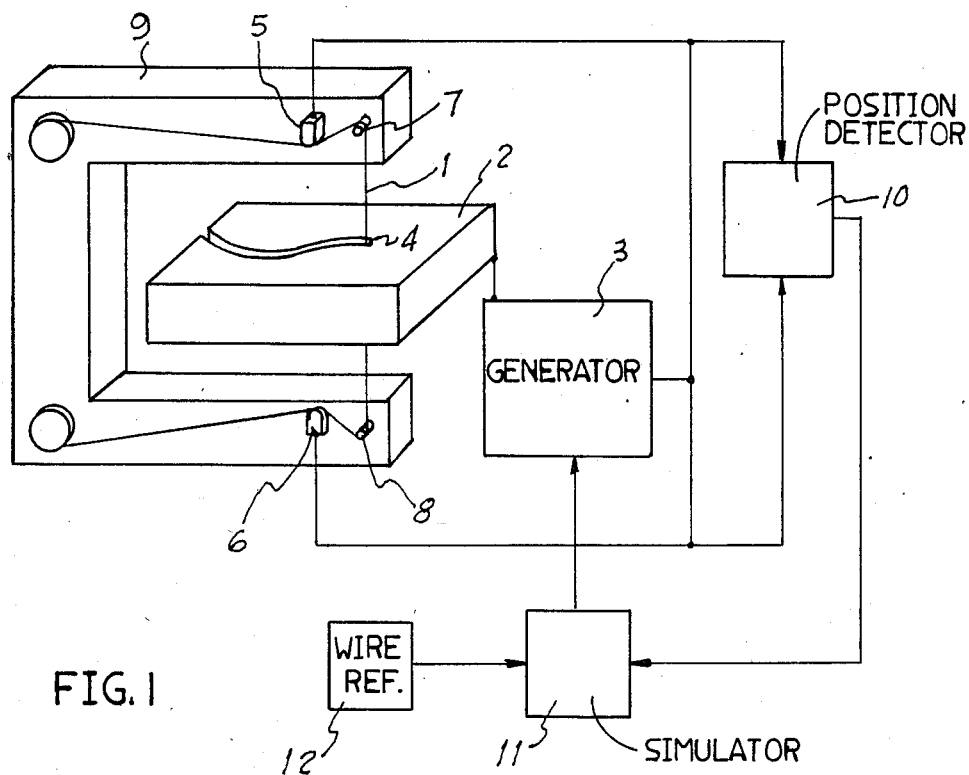
FIG. 1 illustrates schematically a travelling wire EDM apparatus provided with a monitoring and control improvement according to the invention.

Referring to the drawings, and more particularly to FIG. 1, there is schematically illustrated a travelling wire EDM apparatus for cutting, by means of an electrode wire 1, an electrode workpiece 2. Consecutive electrical pulses are applied at a predetermined frequency across the wire 1 and the workpiece 2 by a pulse generator 3, such that electrical discharges occur in a machining zone 4 between the wire 1 and the workpiece 2.

The wire 1 is obtained from a reel or spool and is fed longitudinally through the machining zone 4, a pair of electrical contacts 5 and 6, one disposed on one side of the machining zone and the other on the other side, connecting the wire 1 to a terminal of the pulse generator 3, the other terminal of the pulse generator 3 being connected to the workpiece 2. The wire 1 is displaced longitudinally, stretched between an upper guide member 7 and a lower guide member 8 mounted on the end of a bifurcated frame member 9, by appropriate wire conveying means, not shown, as is well known in the art. The bifurcated frame member 9 and the workpiece 2 are displaced relative to each other by means of servo motors, not shown, controlled by an appropriate numerical control unit, now shown, according to a programmed path, all features well known in the EDM art. The machining current of the electrical discharges causes ohmic heating of the wire due to the inherent resistance, and further localized heating of the wire is caused by each electrical discharge where it occurs.

A detection, or monitoring, circuit 10 which detects the location of the electrical discharges is connected across the contacts 5 and 6. The detection circuit 10 permits a determination of the specific sector of the electrode wire in which an electrical discharge has taken place. An appropriate detection or monitoring circuit is described in the published patent application DE-OS No. 3.026.508. The apparatus illustrated at FIG. 1 also comprises a simulator circuit 11 that establishes, by means of the information received from the detection or monitoring circuit 10, and as a function of the characteristic values of the wire as supplied by a circuit 12, a thermal simulation model of the wire. A control signal is developed by the simulator circuit 11 which is applied to the pulse generator 3 such as to decrease the energy of the electrical discharges and thus prevent a rupture of the wire 1.

Figure 2:
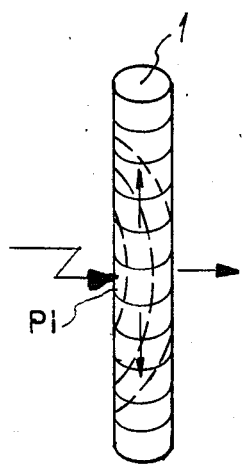
FIG. 2 illustrates schematically the heat propagation through an electrode wire.

Referring now to FIG. 2, there is illustrated a schematic representation of a portion of the wire 1 in the form of a diagram of the heat, broken arrow, supplied to a given sector Pi of the wire 1 during the occurence of an electrical discharge and of the propagation of the heat, straight arrows, through the wire and the ambient, for example the machining fluid supplied between the electrode wire and the workpiece in the machining zone. Taking into account all those factors, the simulation circuit 11 (FIG. 1) provides a signal each time that the simulation model indicates an abnormal heating of one of the sectors Pi of the wire. That signal is applied to the pulse generator 3 in order to vary one of the machining parameters, for example for decreasing the frequency and/or the energy of the electrical discharges.

Figure 3:
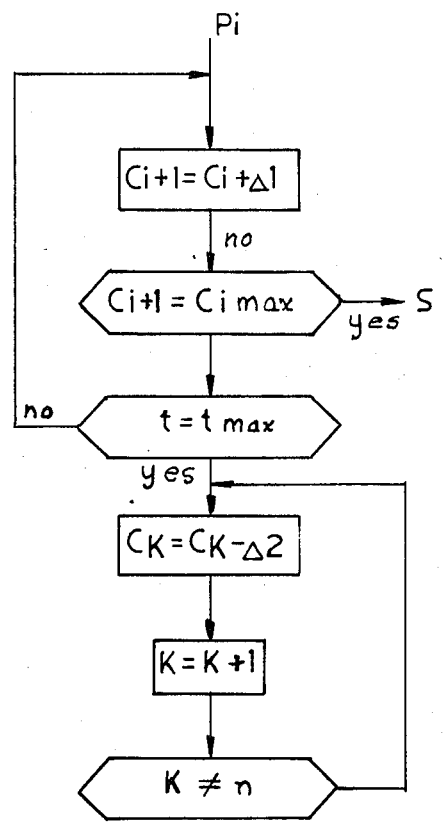
FIG. 3 represents a diagram of a flow chart, or truth table, according to an embodiment of the thermal simulation model of the invention.

It is possible to effectuate the thermal simulation in a programmable mechanical unit, such as a micro-processor or a logic circuit. A flow chart for organizing a very simple simulation model is illustrated at FIG. 3. At each n sectors of the active length of the wire 1 is assigned a counter Ci which is advanced a predetermined increment $\Delta 1$ to simulate the increase in heat each time an electrical discharge occurs in that sector. The counter may thus be advanced one increment for each increment of heat as long as a limit Ci max, representing abnormal heating, is not reached. As soon as the number in one of the counters reaches the limit Ci max, a signal S is supplied to the pulse generator 3 (FIG. 1) to decrease the energy of the electrical discharges, for example. In addition, there is a clock to measure time interval limit t max. When a time period, during which one of the counters has been advanced by increments, corresponding to the time interval limit t max comes to an end, all the N counters are turned back a quantity $\Delta 2$ for the purpose of simulating the heat convection into the machiing fluid. The parameters $\Delta 1$, $\Delta 2$, Ci max and t max are set as a function of the machining conditions. Such a simple simulation model does not take into consideration the heat transfer between adjoining sectors of the wire.

Figure 4:
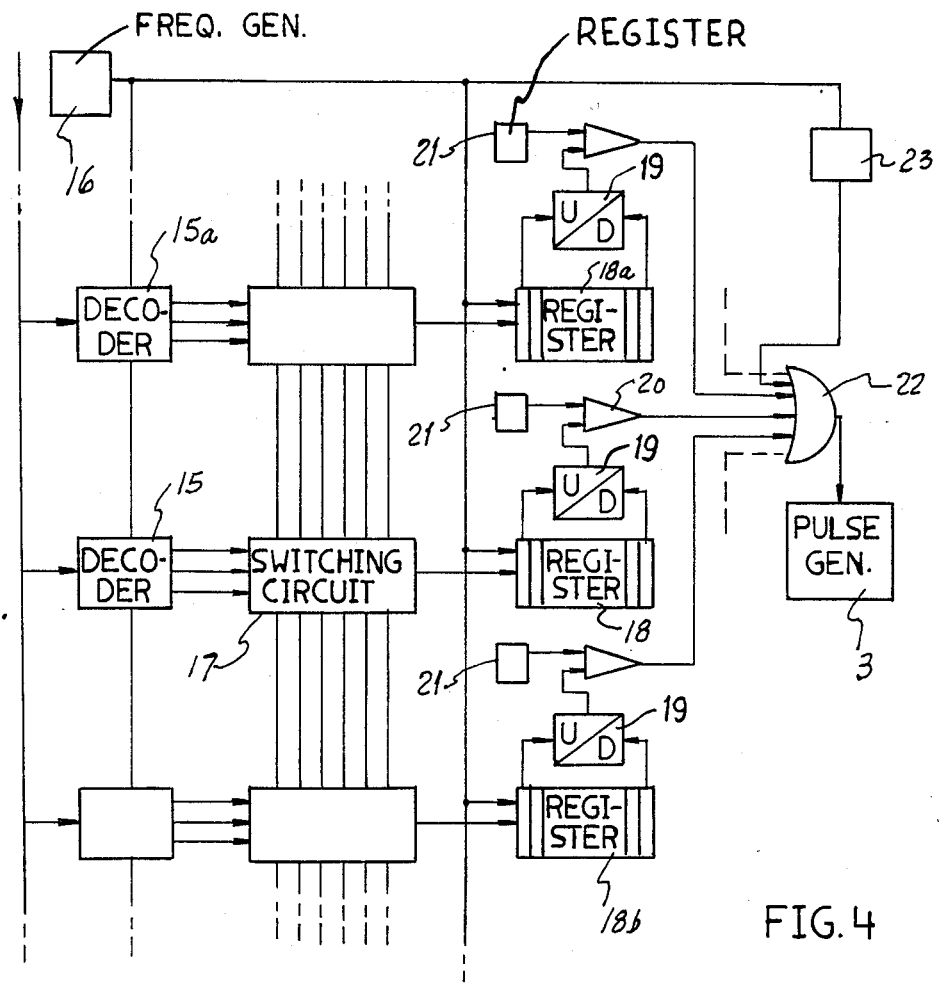
FIG. 4 is a functional schematic of another embodiment of thermal simulation circuit.

The thermal simulation model represented in a digital form at FIG. 4 takes into consideration, in addition, the heat transfer along the length of the wire. Line a supplies to all the wire sector simulation models an encoded digital signal representing the address of a sector in which it is desired to count an electrical discharge. The signal is applied to a decoder circuit 15 which transforms the signal, for example by means of a high frequency generator 16, into three separate signals. The first signal is a train of four high frequency pulses, the second is a train, for example, of two pulses and the third signal is a single pulse. Those signals are applied to a logic switching circuit 17, such as an MOS transmission gate arrays, for example, to direct the four pulse train to a shift register 18 corresponding to the sector of the wire where the electrical discharge occurs, to direct the two pulse train to the two registers 18a and 18b corresponding to the two adjoining wire sectors, and to direct the single pulse to the shift registers, not shown, corresponding to the next wire sectors adjoining the directly adjoining sectors. In this manner, there is provided an approximate simulation of the convection of the heat caused by an electrical discharge in each wire sector to the most proximate wire sectors.

An up/down counter 19 permits tabulation of the pulses stored in each shift register 18. The pulses which overflow from one of the shift registers 18 are subtracted by the counter 19 in order to take into consideration the heat loss into the machining fluid. The number stored in each counter 19 thus represents an approximation of the temperature of a particular wire sector. That number is compared in a comparator 20 to a reference number in a register 21 representing the permissible temperature limit for that wire sector. A signal is provided at the output of the comparator 20 when the reference number in a register 21 is reached. The signal at the output of the comparator 20 is applied to a logic circuit 22, for example an OR gate, whose output is connected to the pulse generator 3 to control one of the machining parameters.

Figure 5:
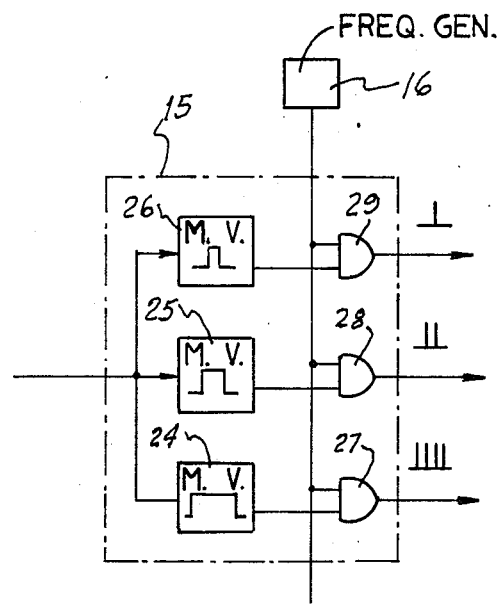
FIG. 5 is a detailed circuit schematic of a portion of the schematic of FIG. 4.

The example of decoder 15 illustrated at FIG. 5 comprises three monostable multivibrators 24, 25 and 26 whose time constants are adjusted such that the AND gates 27, 28 and 29 pass only four, two or one pulse signals from the frequency generator 16.

Figure 6:
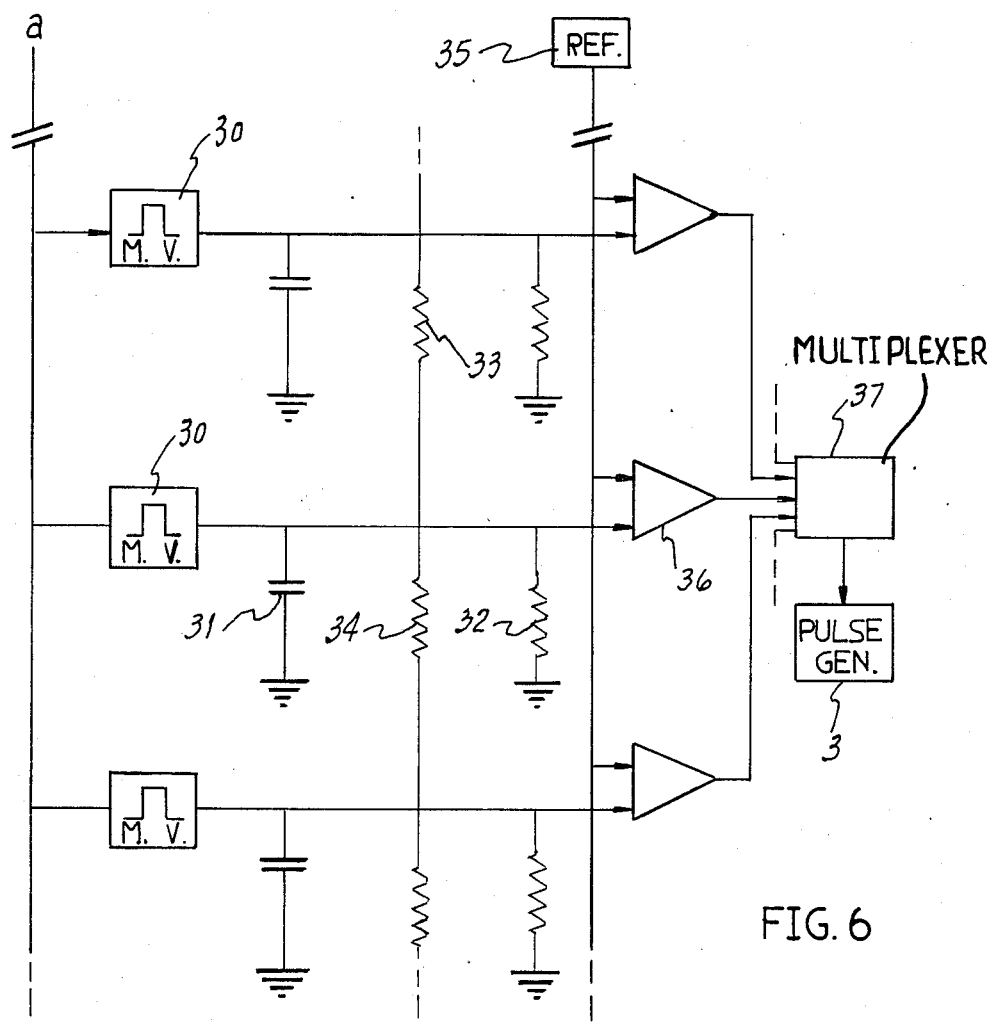
FIG. 6 is a functional block diagram of a third embodiment of thermal simulation circuit.

A schematic of an analog circuit of the wire thermal simulation model is illustrated at FIG. 6. Signals at the output of the detector circuit 10 (FIG. 1) are applied, for each wire sector, to a monostable multivibrator 30, providing an output signal which is calibrated in duration and level relative to the energy of the electrical discharge. The output signal, which is a representation of the heat applied to the wire, charges a capacitor 31. The charging circuit of the capacitor is connected to ground, via a resistor 32 which simulates the heat losses through the machining fluid, and to resistors 33 and 34 connected between adjoining sectors to simulate heat convection along the length of the wire. The voltage across the capacitor 31 is compared to a voltage reference 35 in a comparator circuit 36 which provides a signal at its output as soon as the voltage across the capacitor 31, while being charged, reaches the reference voltage. The signals at the output of the comparators 36 are applied through a multiplexer circuit 37, or an OR gate, to the pulse generator 3 to control the energy of the electrical discharges, in the same manner as by the digital circuit of FIG. 4.

In order to provide a more realistic model of the thermal stress applied to the electrode wire, the heat convection from one wire sector to the next adjoining wire sector, and the longitudinal displacement of the wire, could also be simulated in the schematic of FIG. 4, through the decoder circuit 15 and switching circuit 17 by delaying momentarily the distribution of the pulses as a function of the speed of longitudinal displacement of the wire.

Figure 7:
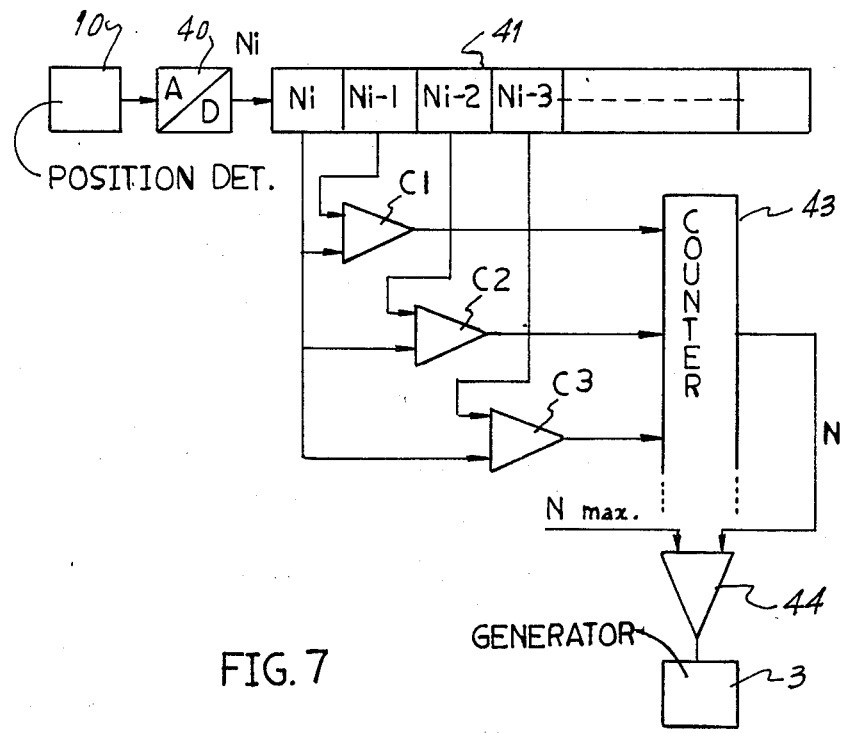
FIG. 7 is a modification of the functional schematic of FIG. 4.

FIG. 7 illustrates a modification of the schematic of FIG. 4 in which a single shift register is used for memorizing the wire sectors in which occurs an electrical discharge. The analog magnitude provided by the position detector circuit 10 (FIG. 1) is converted into a digital signal Ni through an analog/digital convertor 40 each time there occurs an electrical discharge, and the digital signal Ni is stored in a shift register 41. Comparators C1, C2, C3, etc., have inputs connected such as to compare each one of the magnitudes stored in the register 41 with the last magnitude stored in the register. Each comparator supplies a signal at its output every time that the comparison indicates equality at the comparator input. The number of equality signals at the output of the comparators is counted by a counter 43 and the number N in the counter is compared to a maximum number N max in a comparator 44. When the maximum number N max is reached, the comparator 44 provides at its output a signal modifying one of the machining parameters, the energy or power of the electrical discharges supplied by the generator 3, for example, or the pressure of the machining fluid in the machining zone.

Having thus described the present invention by way of examples of circuits for practicing the invention, modifications thereof will be apparent to those skilled in the art, what is claimed as novel is as follows:

I claim:

1. A method for monitoring the thermal stress of an electrode wire longitudinally displaced between two guide members in a travelling wire EDM apparatus in the course of a cut being effected by electrical discharges in an electrode workpiece, said method comprising arbitrarily dividing into a plurality of sectors a length of the electrode wire in a machining zone formed between the electrode wire and the electrode workpiece, detecting each electrical discharge occurring at each of the sectors of the electrode wire, developing for each electrical discharge a magnitude representing the heat supplied to a corresponding one of said wire sectors by said electrical discharge, storing a value of said magnitude to a memory, extracting said value from said memory according to a predetermined time function such as to simulate heat loss in a machining fluid flowing through said machining zone, and providing a signal for modifying a machining parameter as soon as the sum of the values remaining in the memory reaches a predetermined level.

2. The method of claim 1 further comprising associating a predetermined memory with each of said wire sectors, and storing in each memory associated with each of the wire sectors most proximate to a sector at which occurs an electrical discharge values decreased as an inverse function of the proximity of said proximate sectors relative to said sector where the electrical discharge occurs.

3. The method of claim 1 further comprising associating a predetermined memory with each of said sectors, and storing in each memory associated with the wire sectors most proximate to a sector at which occurs an electrical discharge values decreased as a function of the longitudinal displacement of the wire.

4. An apparatus for monitoring the thermal stress of an electrode wire longitudinally displaced between two guide members in a travelling wire EDM apparatus in the course of a cut being effected by electrical discharges in an electrode workpiece wherein the length of the electrode wire in a machining zone formed between the electrode wire and the electrode workpiece is arbitrarily divided into a plurality of sectors, said apparatus comprising detection means for detecting each electrical discharge occuring in each of the sectors of the electrode wire, means for developing for each electrical discharge a magnitude representing the heat supplied to one of said wire sectors by an electrical discharge memory means storing a value of said magnitude, means for extracting said value from said memory means according to a predetermined time function such as to simulate heat loss to a machining fluid flowing through said machining zone, and means for providing a signal modifying a machining parameter as soon as the sum of the values remaining in the memory means reaches a predetermined level.

5. The apparatus of claim 4 wherein a shift register is provided for each wire sector for storing a number as a function of the number of electrical discharges occuring at said sector, and an up/down counter for incrementing the number.

6. The apparatus of claim 5 comprising means for storing in the up/down counters associated each with sectors adjoining said wire sector where occurs an electrical discharge data modified as an inverse function of the proximity of said sectors.

7. The apparatus of claim 5 comprising means for storing in the up/down counter associated each with sectors adjoining said wire sector where occurs an electrical discharge data modified as a function of the longitudinal displacement of said wire.

8. The apparatus of claim 6 comprising means for storing in the up/down counters associated each with sectors adjoining said wire sector where occurs an electrical discharge data modified as an inverse function of the proximity of said sectors and as a function of the longitudinal displacement of the wire.

9. The apparatus of claim 4 comprising a circuit for each wire sector converting the data supplied by said detection means into an analog signal representing the energy of an electrical discharge, a capacitor storing said analog signal, a discharge circuit for said capacitor, and circuit means connecting said capacitor to capacitors associated with adjoining wire sectors.

10. The apparatus of claim 4 comprising a measuring circuit associated with said detection means for providing each electrical discharge with a value corresponding to the wire sector where occurs said discharge, a shift register memorizing a plurality of said values, comparator means for comparing the difference between each memorized value and the last memorized value in the register, and counter means for counting signals provided at said comparator means output after each new electrical discharge.

* * * * *

UNITED STATES PATENT AND TRADEMARK OFFICE
CERTIFICATE OF CORRECTION

PATENT NO. : 4,675,491

DATED : June 23, 1987

INVENTOR(S) : Georges-Andre Marendaz

It is certified that error appears in the above-identified patent and that said Letters Patent is hereby corrected as shown below:

Col. 2, line 65, delete "now" and insert --not--;

Col. 3, line 40, delete "n" to --n--;

Col. 3, line 63, delete "a" to --a--;

Col. 4, line 6, delete "arrays" to --array--.

Signed and Sealed this

First Day of December, 1987

Attest:

DONALD J. QUIGG

Attesting Officer

Commissioner of Patents and Trademarks